United States Patent [19]

Kabasin et al.

[11] Patent Number: 5,138,833
[45] Date of Patent: Aug. 18, 1992

[54] CONVERTER OVERTEMPERATURE PROTECTION SYSTEM AND METHOD

[75] Inventors: Daniel F. Kabasin, Rochester, N.Y.; Charles A. Iannone, Fenton, Mich.

[73] Assignee: General Motors Corporation, Detroit, Mich.

[21] Appl. No.: 767,770

[22] Filed: Sep. 30, 1991

[51] Int. Cl.$^5$ .............................................. F01N 3/20
[52] U.S. Cl. .................................. 60/274; 60/277; 60/285
[58] Field of Search ........................ 60/274, 277, 285

[56] References Cited

U.S. PATENT DOCUMENTS

| | | | |
|---|---|---|---|
| 3,957,444 | 5/1976 | Goto | 60/277 |
| 4,015,428 | 4/1977 | Kawai | 60/277 |
| 4,024,850 | 5/1977 | Peter | 60/277 |

Primary Examiner—Douglas Hart
Attorney, Agent, or Firm—Howard N. Conkey

[57] ABSTRACT

When an incipient overtemperature condition of a catalytic converter of a vehicle is sensed, a cylinder of the vehicle engine having combustion conditions giving rise to the overtemperature condition is identified by selectively disabling fuel delivery to each of the cylinders of the engine in turn and monitoring the response of the converter temperature. If the disabling of the fuel to a particular cylinder results in recovery from the incipient overtemperature condition, fuel to that cylinder is maintained disabled to provide overtemperature protection of the converter.

8 Claims, 4 Drawing Sheets

CONVERTER OVERTEMPERATURE PROTECTION SYSTEM AND METHOD

BACKGROUND OF THE INVENTION

This invention relates to a system and method for protecting a vehicle catalytic converter through which the vehicle engine exhaust gases pass against overtemperature and specifically against an overtemperature condition resulting from ignition misfire or a fueling condition of a particular cylinder of the vehicle engine.

In order to minimize the amounts of certain engine exhaust gas components discharged into the atmosphere, it is common in automotive vehicles to utilize a catalytic converter through which engine exhaust gases are discharged to the atmosphere and which is effective to reduce the amounts of those exhaust gas components. For example, three-way catalytic converters are typically employed to oxidize carbon monoxides and hydrocarbons and to reduce nitrogen oxides.

If the catalytic converter is heated to excessive levels, there is a potential for damage to the converter. One potential cause of excessive converter temperature is ignition misfire that results in unburned hydrocarbons and carbon monoxides being discharged into the exhaust system. Another cause is a faulty injector delivering excessive fuel to a particular cylinder of the engine resulting in unburned hydrocarbons being discharged into the exhaust system. In both cases, the resulting oxidation of those hydrocarbons and carbon monoxides in the converter elevates the temperature of the converter giving rise to the potential overtemperature condition. It is desirable to protect the converter from this overtemperature condition that results from a misfire or other fueling condition of a particular cylinder of the engine.

SUMMARY OF THE INVENTION

In general, this invention determines an incipient converter overtemperature condition and determines if the combustion conditions in any of the cylinders is the cause of the condition. If a problem cylinder is identified as the cause of the incipient overtemperature condition, fuel to that cylinder is disabled to prevent the overtemperature condition from occurring.

In one form of the invention, the incipient overtemperature condition of the converter is determined based on the converter temperature exceeding a calibration temperature value or the rate of increase in converter temperature exceeding a calibration rate value.

In one aspect of the invention, a cylinder having combustion conditions giving rise to an incipient converter overtemperature condition is identified by selectively disabling fuel delivery to each of the cylinders of a port fuel injected engine in turn and monitoring the response of the converter temperature. If the disabling of the fuel to a particular cylinder results in recovery from the incipient overtemperature condition, fuel to that cylinder is maintained disabled to prevent an overtemperature condition from occurring.

DESCRIPTION OF THE DRAWINGS

The invention may be best understood by reference to the following description of a preferred embodiment and the drawings in which:

Referring to FIG. 1, the present invention is described as applied to a vehicle 6-cylinder internal combustion engine 10. A conventional sequential port fuel injection system is provided for the engine 10 wherein fuel injectors INJ1-INJ6 are controlled in timed relation to engine position to deliver fuel to respective cylinders of the engine.

Figure 1:
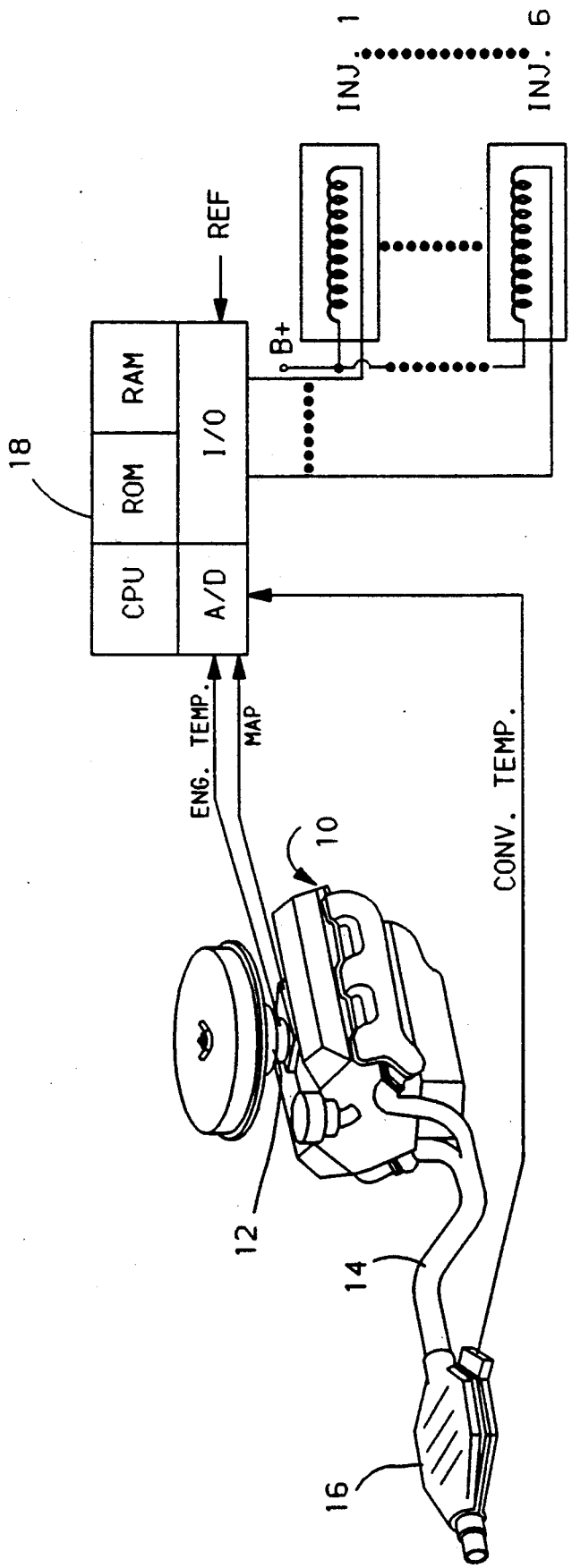
FIG. 1 generally illustrates a port injected internal combustion engine and associated exhaust and fuel control systems.

Air is drawn into the intake manifold of the engine 10 via an intake throttle bore 12 having an operator controlled throttle therein for regulating air flow into the engine 10. Air and the fuel provided by the fuel injectors INJ1-INJ6 are drawn into the engine cylinders where the mixture undergoes combustion to develop driving torque delivered to the driven wheels of the vehicle. The combustion gases from the cylinders are discharged into an exhaust conduit 14, which includes a conventional three-way catalytic converter 16, and then to the atmosphere. The engine 10 is controlled by an electronic controller 18 which takes the form of a standard digital computer along with the standard interface and driver circuits for interfacing and conditioning the input and output signals.

The electronic controller 18 provides for individual control of the fuel injectors INJ1-INJ6 for injecting fuel to each of the respective cylinders of the engine 10 in timed relation to engine rotation. In general, the fuel injectors are controlled in response to various engine and vehicle operating parameters to achieve a scheduled air/fuel ratio. These parameters include engine 10 intake manifold absolute pressure represented by a signal MAP provided by a conventional pressure sensor, engine coolant temperature represented by a signal ETEMP provided by a conventional temperature sensor, engine speed represented by an engine speed signal REF provided in any conventional manner such as by an ignition system distributor in timed relation to engine rotation and having a frequency directly proportional to engine speed, and the air/fuel ratio of the air and fuel mixture delivered to the cylinders of the engine 10 as represented by a signal A/F provided by a conventional oxygen sensor 20 positioned in the exhaust manifold of the engine 10.

The signal A/F is utilized to provide for closed loop adjustment of the air/fuel ratio of the mixture supplied to the engine so as to provide a stoichiometric ratio. This ratio is established after the initial engine warm-up period and when the catalytic converter 16 has heated to is operating temperature where it is effective to oxidize hydrocarbons and carbon monoxides and to reduce nitrogen oxides.

To enable the engine controller 18 to determine an incipient overtemperature condition of the converter 16, the converter temperature represented by a signal CTEMP generated by a conventional temperature sensor 22, such as a thermocouple, is provided to the controller 18. As will be described, this temperature is used to determine an incipient overtemperature condition of the converter 16 and a subsequent recovery from the incipient overtemperature condition.

Figure 2A:
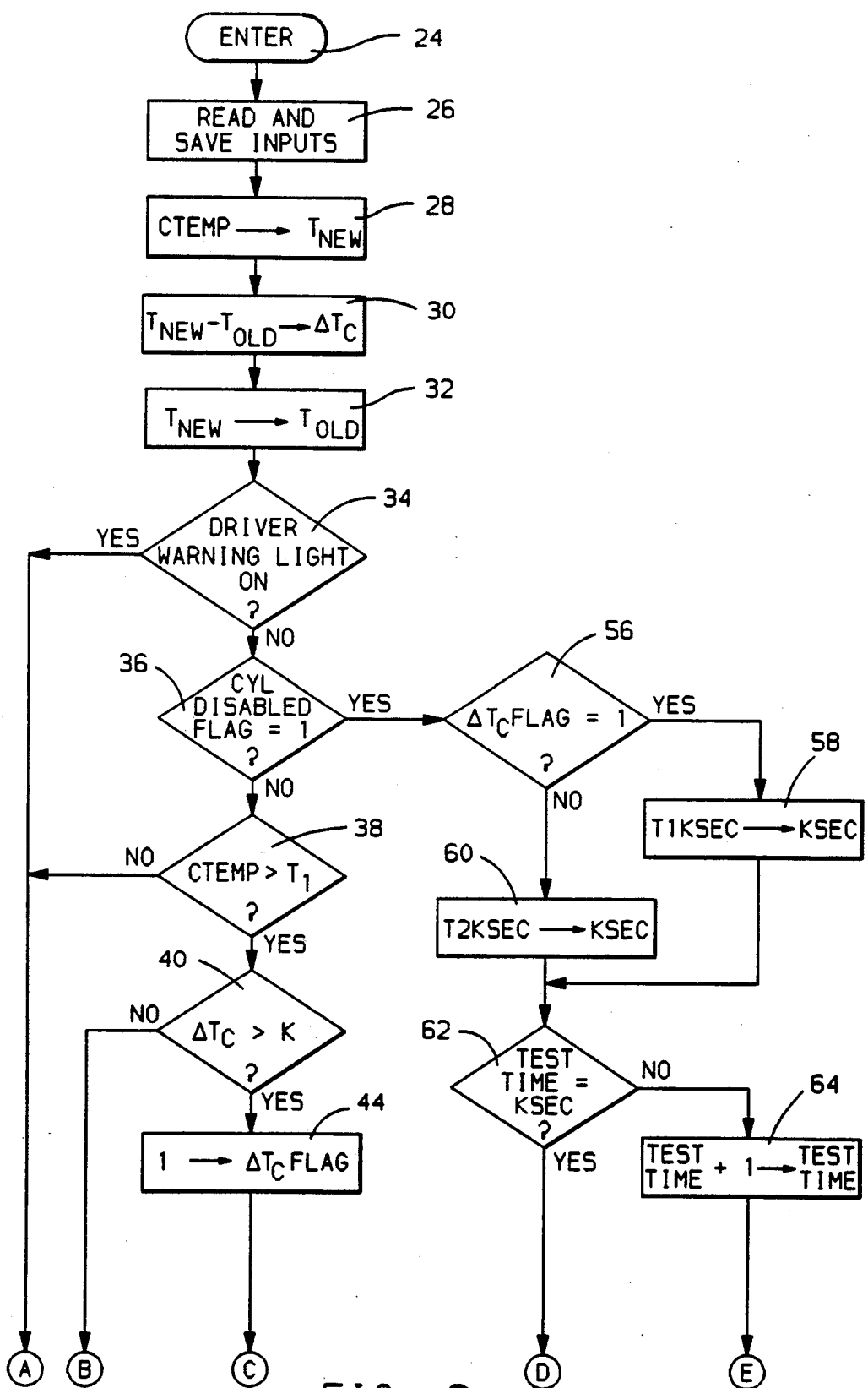
FIGS. 2a, 2b and 3 are flow diagrams illustrating the operation of the electronic controller of FIG. 1 in accord with the principles of this invention.
Figure 2B:
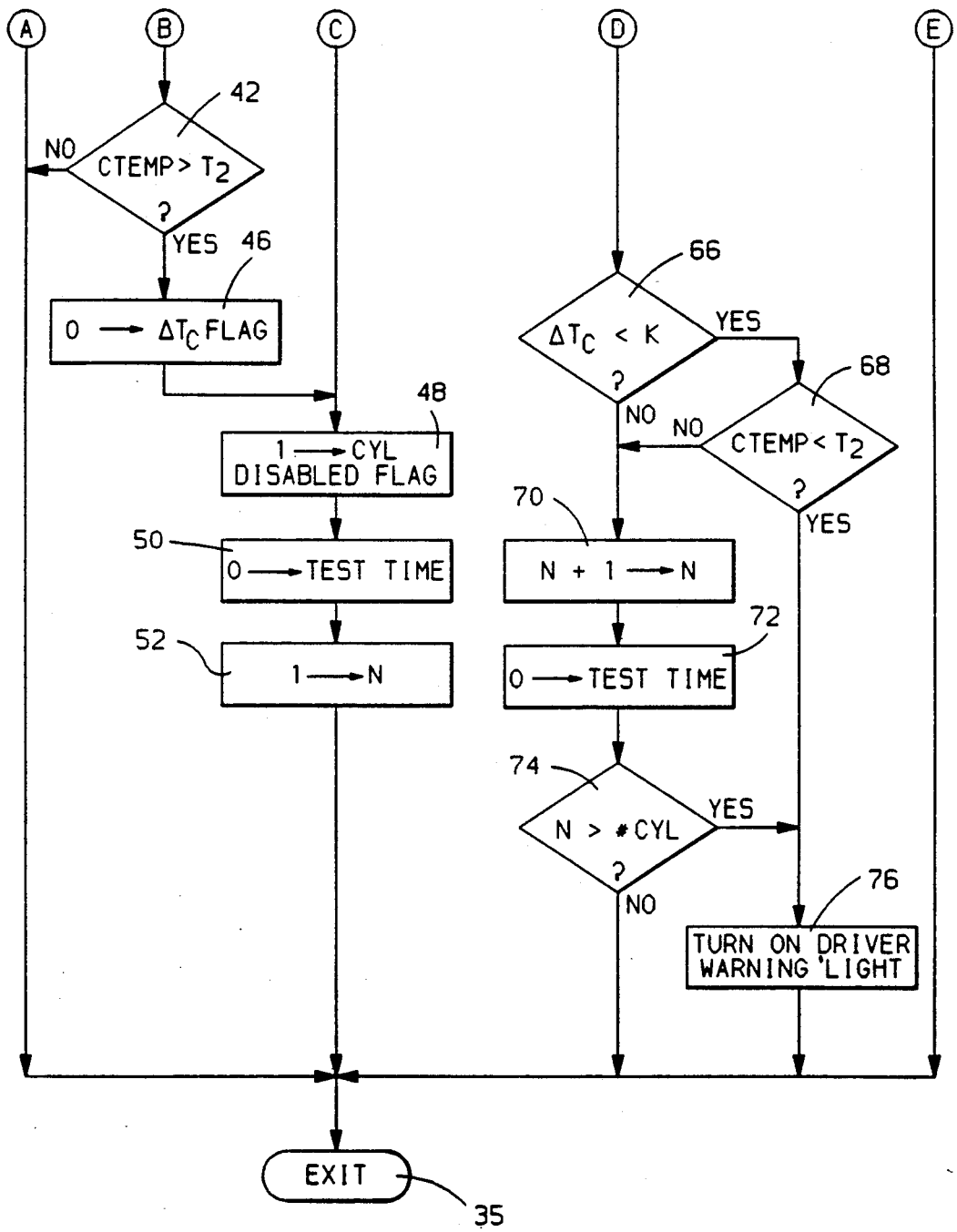
Figure 3:
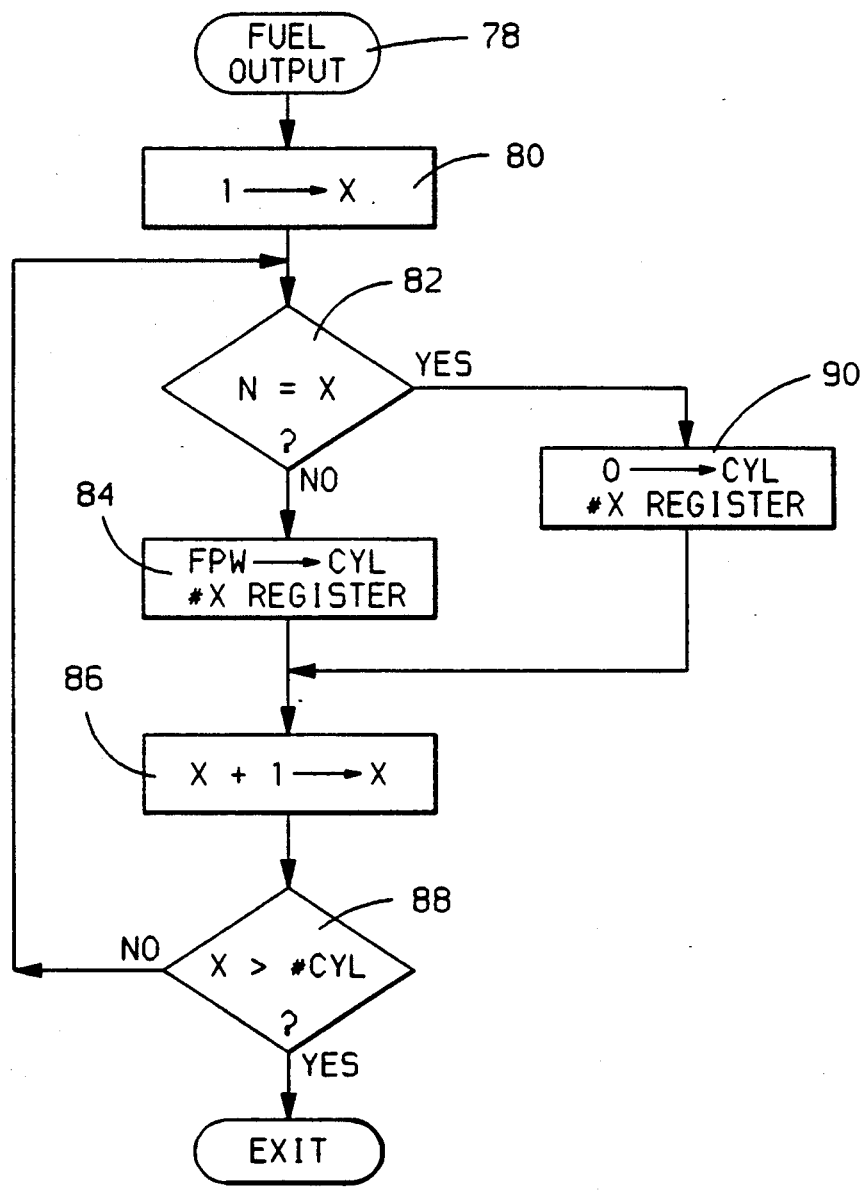

The operation of the electronic controller 18 in protecting the converter 16 from an overtemperature condition that results from a misfire or other combustion condition of a particular cylinder of the engine in accord with this invention is illustrated in FIGS. 2 and 3. The microcomputer contained within the electronic controller 18 has permanently stored therein the instructions necessary to implement the algorithm as diagrammed in this figure. When power is first applied to this system from a vehicle battery (not shown), the computer program is initiated. The program first provides for initialization of various random access memory variables to calibrated values and other functions. For example, converter temperature parameters $T_{NEW}$ and $T_{OLD}$ are set to zero, a cylinder disabled flag is reset, an injector pointer is set to zero, and a driver warning light is turned off. Other parameters and flags may be initialized as required.

When the initialization routine is completed, a background loop may be executed that contains various system maintenance and other routines. This loop may be interrupted by one of possibly several system interrupts whereby control will be shifted to the appropriate interrupt service routine. One such interrupt is a high frequency interrupt provided at, for example 12.5 millisecond intervals whereby a fuel control routine is executed for controlling the fuel injectors INJ1–INJ6 in timed relation to the reference pulses REF and another interrupt is provided at, for example, 100 millisecond intervals during which the converter protection routine of this invention is executed as illustrated in FIG. 2.

Referring to FIG. 2, the converter protection routine is entered at step 24 after which the value of the analog input signal CTEMP is read and saved in memory at step 26. At the next step 28, a new converter temperature parameter $T_{NEW}$ is set equal to the just measured converter temperature value CTEMP after which the rate of change in converter temperature $\Delta T_C$ is determined at step 30 by subtracting an old converter temperature parameter $T_{OLD}$ from the new converter temperature parameter $T_{NEW}$. At step 32, the old converter temperature parameter $T_{OLD}$ is set equal to the new temperature parameter $T_{NEW}$. In this manner, $T_{OLD}$ used at step 30 is the converter temperature CTEMP measured at step 28 during the previous execution of the routing of FIG. 2. Accordingly, $\Delta T_C$ is the change in the measured temperature of the converter 16 over the interrupt interval (100 milliseconds in this embodiment).

At step 34, the state of a driver warning light is sampled. If the warning light is on indicating an incipient converter overtemperature condition was previously diagnosed, the program exits the routine at step 35. Otherwise, the state of a cylinder disabled flag is sampled at step 36 to determine if the routine is in the process of identifying a cylinder that is misfiring or otherwise has a combustion condition that gave rise to a sensed incipient converter overtemperature condition. If the flag is reset indicating that an incipient overtemperature condition has not been diagnosed, the routine next determines via steps 38–42 if an incipient converter overtemperature condition exists.

In this embodiment, an incipient overtemperature condition is sensed if the last measured converter temperature CTEMP is greater than a calibration constant $T_1$, such as 600° C. (step 38) and the rate of increase in converter temperature $\Delta T_C$ determined at step 30 is greater than a calibration constant K (step 40) or if the last measured converter temperature is greater than a calibration constant $T_2$, such as 800° C. (step 42). If an overtemperature condition is not sensed, the routine exits at step 35. However, if an overtemperature condition is sensed by either step 40 or 42, the state of a $\Delta T_C$ flag is controlled to indicate the basis for the diagnosed incipient overtemperature condition. Specifically, the $\Delta T_C$ flag is set at step 44 if the rate of increase in converter temperature $\Delta T_C$ indicates an incipient overtemperature condition and the $\Delta T_C$ flag is reset at step 46 if the converter temperature CTEMP indicates an incipient overtemperature condition.

Once an incipient overtemperature condition of the converter 16 is sensed, the cylinder giving rise to the condition is identified and the fuel injector delivering fuel to that identified cylinder is maintained disabled via the fuel control routine to allow recovery from the incipient overtemperature condition and thereby prevent an overtemperature condition from occurring. This is accomplished by disabling individual fuel injectors in turn and monitoring the response of the temperature of the converter 16. If a recovery from the incipient overtemperature condition results from the disabling of a particular fuel injector, that cylinder is then identified as the problem cylinder and that fuel injector is maintained disabled to provide overtemperature protection for the converter 16.

The forgoing procedure is begun at step 48 during the present execution of the routine by setting the cylinder disabled flag sampled at step 36. Step 50 then resets a test time after which a cylinder identification pointer N is set to 1 at step 52 identifying the first fuel injector to be disabled by the fuel control routine. During the next and subsequent executions of the routine of FIG. 2, step 36 senses the set condition of the cylinder disabled flag after which the routine proceeds to determine if the response of the converter temperature to the disabled fuel injector indicates a recovery from the incipient overtemperature condition. If not, then the routine points to the next cylinder whose injector is to be disabled by the fuel control routine. This procedure is repeated with the injectors disabled one at a time in turn until the response of the temperature of the converter to a disabled injector indicates a recovery from the incipient overtemperature condition. Once this recovery condition is sensed, the cylinder experiencing a misfire or other combustion condition giving rise to the overtemperature condition has been identified and the corresponding injector maintained disabled to provide overtemperature protection for the converter 16.

Returning now to step 36, when the set condition of the cylinder disabled flag is sensed, steps 56–60 are executed to establish an appropriate wait period KSEC to enable the temperature of the converter to respond to the disabled cylinder after which the routine determines if there has been a recovery from the incipient overtemperature condition. In particular, step 56 determines if the sensed incipient overtemperature condition was based on a rate of increase in the converter temperature ($\Delta T_C$ flag set) or based on the temperature exceeding the temperature threshold $T_2$ ($\Delta T_C$ flag reset). If based on a rate of increase in converter temperature, the wait time KSEC is set to a calibration time T1KSEC at step 58 and if based on the temperature exceeding the threshold, the wait time KSEC is set to a longer calibration time T2KSEC at step 60.

Thereafter, step 62 compares the test time with the set wait time. If the wait time has not expired, step 64 increments the test time after which the program exits at step 35. When the test time has been incremented to a count equal to the wait time KSEC via repeated executions of the routine, the program determines if a recovery from the incipient overtemperature condition has occurred. A recovery condition is indicated if step 66 determines that the rate of change $\Delta T_C$ in the converter temperature is less than the value K and the converter temperature CTEMP is less than the threshold $T_2$. If these conditions are not met, then the disabled cylinder is not the cause of the incipient overtemperature condition and the program increments the cylinder pointer N at step 70 to point to the next cylinder whose injector is to be disabled by the fuel control routine and then resets the test time at step 72. Step 74 then determines if the value of N exceeds the number of cylinders (six in this embodiment). If not, the program exits at point 35.

If steps 66 and 68 indicate a recovery from the incipient overtemperature condition, the faulty cylinder giving rise to the condition has been identified by the routine. When this recovery condition is sensed, the driver warning light is energized at step 76 to warn the vehicle operator of the fault condition after which the program exits the routine at step 35. During subsequent executions of the routine, the program exits the routine from step 34 which senses the on condition of the driver warning light set at step 76. It can be seen that the cylinder pointer N value is not changed once the faulty cylinder has been identified so that the injector corresponding to the identified cylinder is continually disabled to inhibit the condition giving rise to the incipient overtemperature condition to thereby provide overtemperature protection for the converter 16.

Returning to step 74, if the value of the cylinder pointer N as incremented at step 70 exceeds the number of cylinders of the engine, a condition exists wherein all of the cylinders have been disabled in turn and no recovery from the incipient overtemperature condition was detected. When this condition is sensed the program proceeds to step 76 to energize the driver warning lamp to warn the operator of the impending overtemperature condition.

The routine for determining the injection pulse width to establish the desired air/fuel ratio and for issuing an injection pulse of a specified duration to the appropriate fuel injector in timed relation to engine rotation takes the form of any standard sequential fuel injection control routine. FIG. 3 illustrates a fuel output routine that may further be employed in those fuel control routines for disabling the fuel injector corresponding to the cylinder identified by the routine of FIG. 2. In the routine of FIG. 3, the fuel pulse width value in terms of a specified number of clock pulses for each injector is loaded into respective registers with each register being associated with a particular fuel injector. In a conventional manner, when a reference pulse is generated corresponding to a particular cylinder, the controller issues a fuel injection pulse having a duration corresponding to the pulse width value stored in the register associated with the fuel injector of that cylinder. In a typical production system using a free running counter clocked by an internal clock signal for timing, the desired pulse width is added to the count of the free running counter, loaded into a compare register and the fuel pulse initiated. When the free running counter equals the value in the compare register, the fuel pulse is terminated.

The routine of FIG. 3 is entered at step 78 after which step 80 sets a cylinder pointer X to 1 representing the first cylinder. At the next step 82, the cylinder pointer X is compared to the cylinder pointer N set by the routine of FIG. 2 as previously described. If the two pointers do not identify the same cylinder, then step 84 loads the fuel injection pulse width determined in the fuel control routine into the register corresponding to the fuel injector providing fuel to the cylinder identified by the pointer X value. The cylinder pointer X is then incremented at step 86 and compared at step 88 with the total number of cylinders in the engine 10. If all of the registers for controlling the individual injectors have not been updated with the most recently computed fuel pulse width value, the routine returns to step 82. The foregoing steps are repeated until the cylinder pointer X is equal to the cylinder pointer N. When this condition is sensed, step 90 loads a zero pulse width value in the register corresponding to the fuel injector providing fuel to the cylinder represented by the pointer X value. This results in no injection pulse being issued to that injector thereby effectively disabling the injector.

The foregoing steps are repeated until step 88 determines that all of the registers have been updated after which the routine exits at point 92. In this manner, the injector identified by the converter protection routine of FIG. 2 is disabled to enable the detection of a misfire or other condition giving rise to an incipient overtemperature condition and the protection against an overtemperature condition of the converter.

In another embodiment, the selected injector may be disabled by the routine of FIG. 2 by closing a logic gate whose output is coupled to the selected injector.

While a specific preferred embodiment has been described, it is understood many modifications may be made by the exercise of skill in the art without departing from the scope of the invention.

The embodiments of the invention in which an exclusive property or privilege is claimed are defined as follows:

1. A method of preventing an overtemperature condition of a vehicle catalytic converter through which exhaust gases discharged from cylinders of an internal combustion engine of the vehicle pass, the engine including means for delivering a mixture of air and fuel to the cylinders for combustion therein, the method comprising the steps of:
sensing converter temperature;
determining when the sensed converter temperature represents an incipient overtemperature condition;
selectively inhibiting delivery of fuel to the cylinders of the engine in turn when an incipient overtemperature condition is determined;
sensing for a recovery from the determined incipient overtemperature condition while fuel to the cylinders of the engine are selectively inhibited; and
continuously inhibiting fuel to a cylinder when recovery from the determined incipient overtemperature condition is sensed while fuel to said cylinder is selectively inhibited.

2. The method of claim 1 wherein the step of determining when the sensed converter temperature represents an incipient overtemperature condition includes:
determining the rate of increase in the sensed converter temperature and
determining an incipient overtemperature condition when the determined rate of increase exceeds a predetermined value.

3. The method of claim 2 wherein the step of sensing for a recovery from the determined incipient overtemperature condition senses said recovery when the rate of increase in the sensed converter temperature becomes less than the predetermined value.

4. A method of preventing an overtemperature condition of a vehicle catalytic converter through which exhaust gases discharged from cylinders of an internal combustion engine of the vehicle pass, the engine including a fuel injector for each cylinder of the engine controlled in timed relation to engine rotation to supply fuel said cylinder for combustion therein, the method comprising the steps of:

sensing converter temperature;

determining when the sensed converter temperature represents an incipient overtemperature condition;

when an incipient overtemperature condition is determined, sequentially disabling the fuel injectors in turn for a predetermined test time period for each fuel injector to sequentially inhibit delivery of fuel to the cylinders of the engine in turn;

sensing for a recovery from the determined incipient overtemperature condition during the period each fuel injector is disabled; and continuously disabling a fuel injector when recovery from the determined incipient overtemperature condition is sensed while said fuel injector is disabled by the step of sequentially disabling the fuel injectors so as to provide overtemperature protection for the converter.

5. The method of claim 4 further including the step of sensing the rate of increase in the sensed converter temperature and wherein (A) the step of determining when the sensed converter temperature represents an incipient overtemperature condition determines said condition when the rate of increase is greater that a predetermined rate value or the temperature is greater than a predetermined temperature value and (B) the step of sensing for a recovery from the determined incipient overtemperature condition senses said recovery when the determined the rate of increase is less than the predetermined rate value and the temperature is less than the predetermined temperature value.

6. The method of claim 5 wherein the predetermined test time period has a first time value when the incipient overtemperature condition is determined when the rate of increase is greater than the predetermined rate value and has a second time value when the incipient overtemperature condition is determined when the temperature is greater than the predetermined temperature value.

7. A method of preventing an overtemperature condition of a vehicle catalytic converter through which exhaust gases discharged from cylinders of an internal combustion engine of the vehicle pass, the engine including means for delivering a mixture of air and fuel to the cylinders for combustion therein, the method comprising the steps of:

sensing converter temperature;

determining when the sensed converter temperature represents an incipient overtemperature condition;

identifying a cylinder having combustion conditions causing a determined incipient overtemperature condition by (A) sequentially inhibiting delivery of fuel to each of the cylinders of the engine in turn and each for a predetermined time period when an incipient overtemperature condition is determined and (B) sensing for a response of the converter temperature during the time period that fuel to each cylinder is inhibited; and continuously inhibiting fuel to a cylinder when the sensed response of the converter temperature while fuel to said cylinder is inhibited represents a recovery from the determined incipient overtemperature condition.

8. A system for preventing an overtemperature condition of a vehicle catalytic converter through which exhaust gases discharged from cylinders of an internal combustion engine of the vehicle pass, the system comprising, in combination:

means for delivering fuel to the cylinders of the engine for combustion therein;

means for sensing converter temperature; and means for (A) determining when the sensed converter temperature represents an incipient overtemperature condition, (B) controlling the means for delivering fuel when an incipient overtemperature condition is determined so as to sequentially inhibit delivery of fuel to the cylinders of the engine in turn, (C) sensing for a recovery from the determined incipient overtemperature condition while fuel to the cylinders of the engine are sequentially inhibited, and (D) continuously controlling the means for delivering fuel so as to inhibiting fuel to a cylinder when recovery from the determined incipient overtemperature condition is sensed while fuel to said cylinder is inhibited.

* * * * *